United States Patent
Toolan et al.

(10) Patent No.: US 12,471,568 B2
(45) Date of Patent: Nov. 18, 2025

(54) TREAT DISPENSING TOY FOR PETS

(71) Applicant: Benebone LLC, Westport, CT (US)

(72) Inventors: Peter Toolan, Westport, CT (US); Evan L. Ryan, Evanston, IL (US)

(73) Assignee: Benebone LLC, Westport, CT (US)

( * ) Notice: Subject to any disclaimer, the term of this patent is extended or adjusted under 35 U.S.C. 154(b) by 0 days.

(21) Appl. No.: 17/743,114

(22) Filed: May 12, 2022

(65) Prior Publication Data

US 2022/0361451 A1    Nov. 17, 2022

Related U.S. Application Data

(60) Provisional application No. 63/188,922, filed on May 14, 2021.

(51) Int. Cl.
*A01K 15/02*    (2006.01)

(52) U.S. Cl.
CPC .................................. *A01K 15/025* (2013.01)

(58) Field of Classification Search
CPC ..................................................... A01K 15/025
USPC ......................................................... 119/707
See application file for complete search history.

(56) References Cited

U.S. PATENT DOCUMENTS

| | | | |
|---|---|---|---|
| 6,073,581 A * | 6/2000 | Wang | A01K 5/0114 |
| | | | 119/51.01 |
| 6,557,496 B2 | 5/2003 | Herrenbruck | |
| 7,600,488 B2 | 10/2009 | Mann | |
| 8,904,967 B2 | 12/2014 | Reiss et al. | |
| 8,997,689 B2 | 4/2015 | Ragonetti | |
| 9,301,496 B2 | 4/2016 | Reiss et al. | |
| 9,462,787 B2 * | 10/2016 | Christianson | A01K 5/0275 |
| 9,992,975 B2 * | 6/2018 | Wolfe, Jr. | A01K 15/025 |
| 10,149,457 B2 | 12/2018 | Vance | |
| 10,485,220 B2 | 11/2019 | Valle | |
| 10,524,453 B2 | 1/2020 | Stone | |
| 10,721,916 B2 | 7/2020 | Yang et al. | |
| 10,888,068 B2 | 1/2021 | Yang et al. | |
| 10,932,443 B2 | 3/2021 | Simon | |
| D917,799 S | 4/2021 | Vu | |
| 10,973,207 B1 | 4/2021 | Ettehadieh | |
| D975,381 S | 1/2023 | Wu | |
| D985,219 S | 5/2023 | Li | |
| 11,712,024 B2 | 8/2023 | Steinkraus et al. | |
| 2002/0106968 A1 * | 8/2002 | Herrenbruck | A01K 15/025 |
| | | | 446/475 |
| 2005/0045115 A1 * | 3/2005 | Mann | A01K 15/026 |
| | | | 119/711 |

(Continued)

OTHER PUBLICATIONS

Benebone LLC, U.S. Appl. No. 29/783,816, filed May 14, 2021.

*Primary Examiner* — Joshua J Michener
*Assistant Examiner* — Nicole Paige Maccrate
(74) *Attorney, Agent, or Firm* — Fred Zollinger

(57) ABSTRACT

A toy for a domestic pet can be used as a fetch toy or as an interactive toy that releases edible treats for the pet. The toy includes a mostly hollow body that defines at least one treat-dispensing opening. A scoop is disposed inwardly of the treat-dispensing opening to provide an amount of control over the dispensing of the treats. The scoop both helps dispense treats and limits the number of treats that are dispensed. The scoop is disposed inside the toy where the pet cannot easily interact with it or alter its operation.

19 Claims, 4 Drawing Sheets

(56) References Cited

U.S. PATENT DOCUMENTS

| | | | | |
|---|---|---|---|---|
| 2006/0254531 A1* | 11/2006 | Willinger | ............ | A01K 5/0114 |
| | | | | 119/710 |
| 2007/0022971 A1* | 2/2007 | Renforth | ............. | A01K 15/026 |
| | | | | 119/707 |
| 2007/0289553 A1* | 12/2007 | Jager | ................... | A01K 15/026 |
| | | | | 119/710 |
| 2009/0314221 A1* | 12/2009 | Wang | ................... | A01K 15/025 |
| | | | | 119/707 |
| 2014/0261194 A1* | 9/2014 | Cloutier | .............. | A01K 15/025 |
| | | | | 119/51.01 |
| 2015/0128875 A1 | 5/2015 | Christianson et al. | | |
| 2016/0095296 A1 | 4/2016 | Ishikawa | | |
| 2016/0278342 A1* | 9/2016 | Wolfe, Jr. | ............ | A01K 5/0114 |
| 2017/0303509 A1 | 10/2017 | Stone | | |
| 2021/0112778 A1 | 4/2021 | King | | |
| 2021/0235668 A1 | 8/2021 | Jackson | | |

\* cited by examiner

TREAT DISPENSING TOY FOR PETS

CROSS REFERENCE TO RELATED APPLICATIONS

This application claims the benefit of U.S. Provisional Patent Application No. 63/188,922 filed 14 May 2021; the disclosure of which are incorporated herein by reference.

BACKGROUND OF THE DISCLOSURE

1. Technical Field

The disclosure relates to toys for domestic pets and, more particularly, to a toy that dispenses edible treats while in use. Specifically, the disclosure relates to a rollable, mostly hollow, elongated ball having first and second openings at its opposed ends with winged treat scoops disposed inwardly of each opening.

2. Background Information

Toys that reward pet interaction with edible treats having become popular with pet owners. These toys include those that hold a spreadable material such as peanut butter and those toys which dispense kibble when the pet moves the toy in a way designed to dispense the kibble. Toy designers don't want to make a toy with a dispensing action so difficult that the pet loses interest in the toy. On the other hand, designers don't want a toy that easily dispenses all of its treats in a short time because the toy ideally should entertain the pet for a relatively long time.

SUMMARY OF THE DISCLOSURE

The disclosure provides a toy for a domestic pet. The toy can be used as a fetch toy or as an interactive toy that releases edible treats for the pet. The toy includes a mostly hollow body that defines at least one treat-dispensing opening. A scoop is disposed inwardly of the treat-dispensing opening to provide an amount of control over the dispensing of the treats. The scoop both helps dispense treats and limits the number of treats that are dispensed. The scoop is disposed inside the toy where the pet cannot easily interact with it or alter its operation.

In an exemplary configuration, the toy includes a hollow body that is elongated at first and second opposite ends. The body defines first and second treat-dispensing openings at the opposite ends of the body. The openings are also disposed on the body's longitudinal axis of rotation defined by the longer dimension and by which the toy rolls. When the toy is rolled, the openings are raised from the lowermost portion of the toy body so that treats do not readily fall out of the openings. A treat scoop is disposed inwardly of each opening. Wings extending from the scoops lift treats up the openings for dispensing as the toy is rolled. The wings can be aligned with each other or offset.

In an exemplary configuration, a generally flat wall surrounds each treat dispensing opening. The toy can be stood up vertically on either of the flat walls.

The preceding non-limiting aspects, as well as others, are more particularly described below. A more complete understanding of the toy and how it operates can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Figure 1:
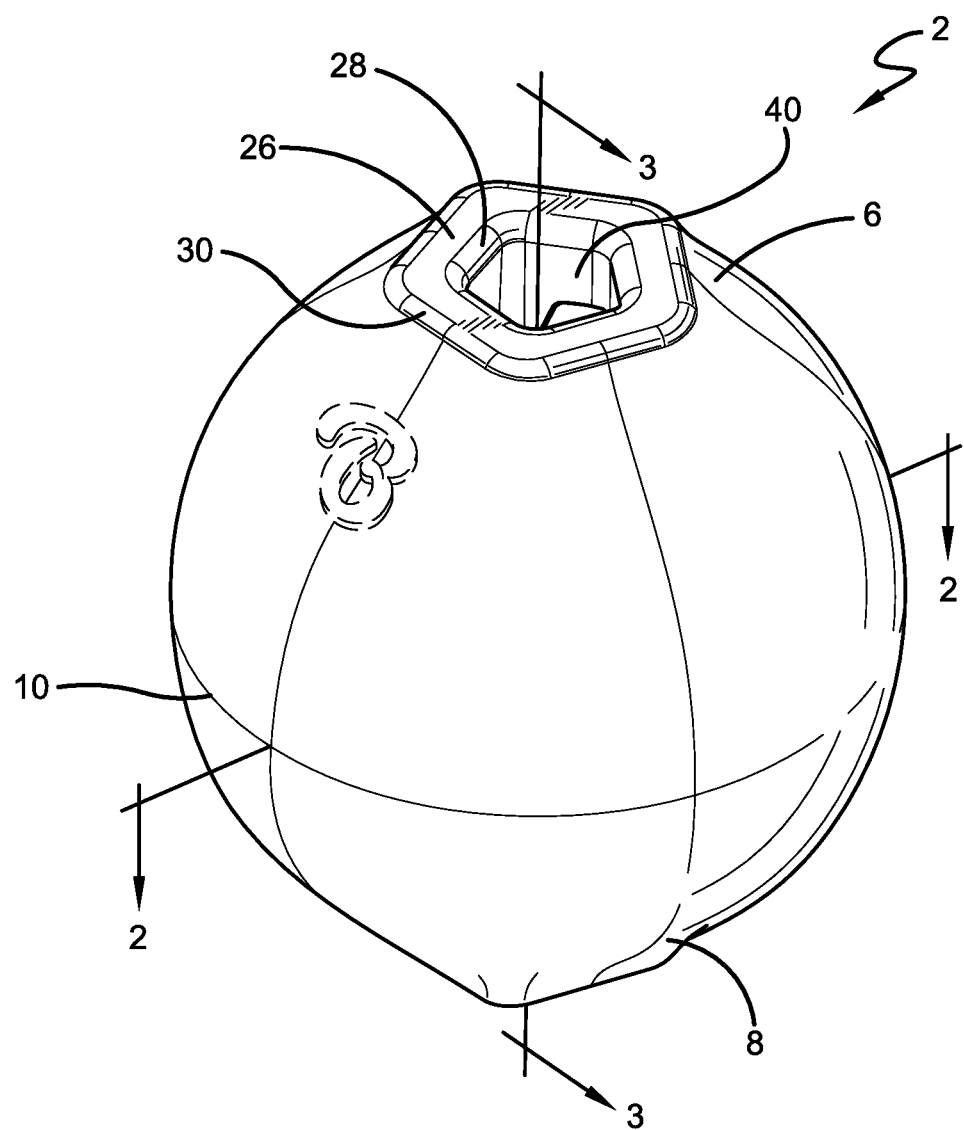
FIG. 1 is an upper perspective view of an exemplary configuration of the treat dispensing toy of the disclosure.
Figure 2:
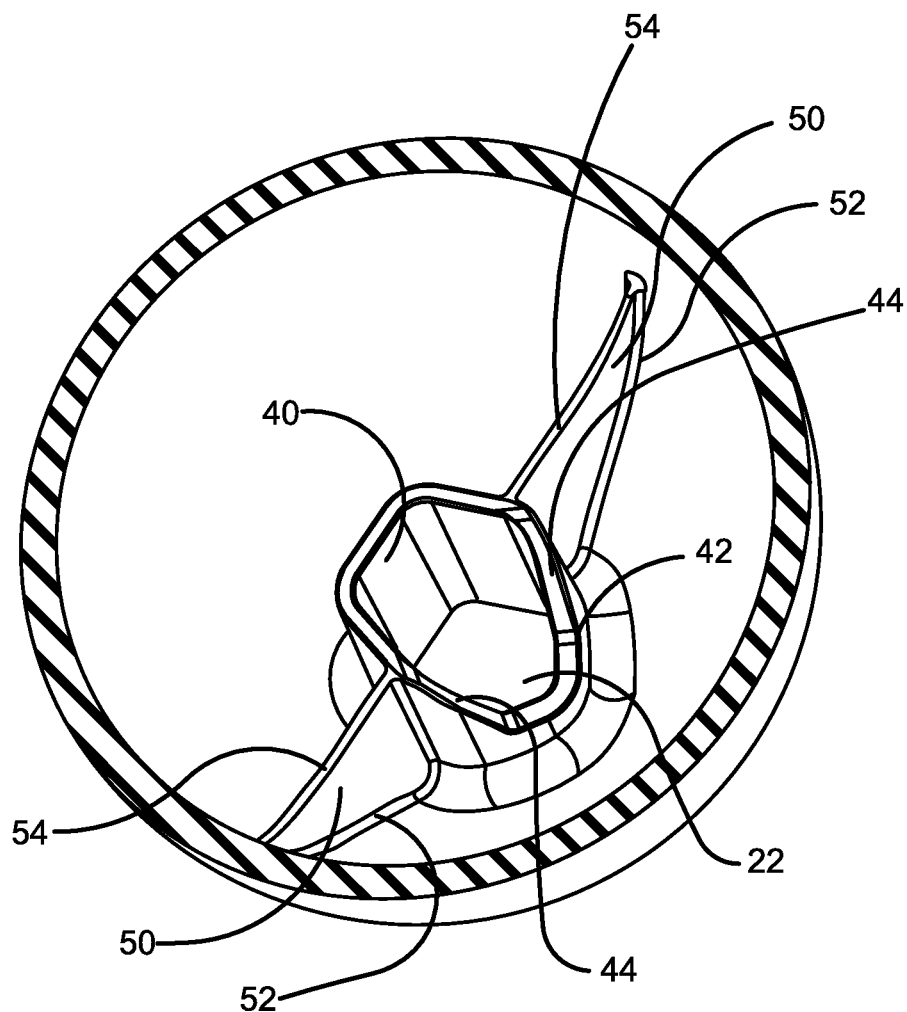
FIG. 2 is a section view taken along line 2-2 of FIG. 1.

An exemplary configuration of a treat dispensing toy for pets is indicated generally by the reference numeral 2 in the accompany drawings. Toy 2 includes a generally round, substantially hollow body defined by an outer wall that is made from a tough polymer or rubber material designed to resist pet teeth, moderate chewing from pets, and outdoor play. The body is elongated along one axis (the vertical longitudinal reference axis 4 of FIG. 3) and has two elongated ends 6 and 8. The body is five to twenty percent longer along elongated axis 4. In one configuration, the body is ten percent longer along elongated axis 4. In this configuration, the diameter at the equator 10 is 4.25 inches with the height between ends 6 and 8 being 4.68 inches. The body is substantially spherical at its equator (reference line 10). When turned on its side and rolled at a slow to moderate speed along its equator 10, elongated ends 6 and 8 maintain the general orientation keeping equator 10 of the body generally in contact with the ground while allowing the body to wobble back and forth.

At least one of ends 6 and 8 define a treat dispensing opening. The treat dispensing opening provides access to the interior of the body and allows treats such as dried kibble to be loaded into the body and for the treats to fall out of the body as toy 2 is moved around. In the exemplary configuration, the body defines a first opening 20 at first end 6 and a second opening 22 at end 8. With openings 20 and 22 located at ends 6 and 8, each opening 20 and 22 is above the ground when toy 2 is on its side with its equator 10 on the ground. In the exemplary configuration, each opening 20 and 22 is in the shape of a pentagon. In other configuration, openings 20 and 22 can be provided in shapes such as circles, squares, hexagons, and octagons. Further, openings 20 and 22 can be provided in different shapes from each other.

About each opening 20 and 22, the body defines a rim with a flat surface 26 located between an inner rounded shoulder 28 and an outer rounded shoulder 30. Flat surfaces 26 allow toy 2 to stand vertically on either end 6 or 8.

A scoop 40 extends into the body around each opening 20 and 22. Each scoop 40 is defined by a wall that extends inwardly from the inner end of inner rounded shoulder 28 such that the inner surface of the scoop wall is a smooth continuation of inner rounded shoulder 28. In a cross section taken perpendicular to axis 4, the scoop wall has a cross section that is the same shape as the treat dispensing opening. In the exemplary configuration, this cross sectional shape of the scoop wall is a pentagon. The inner end of scoop 40 is open which allows treats to enter scoop 40 from the inside of the body where they can then be dispensed through the treat dispensing opening. Also in the exemplary configuration, the scoop wall is parallel to axis 4.

Figure 3:
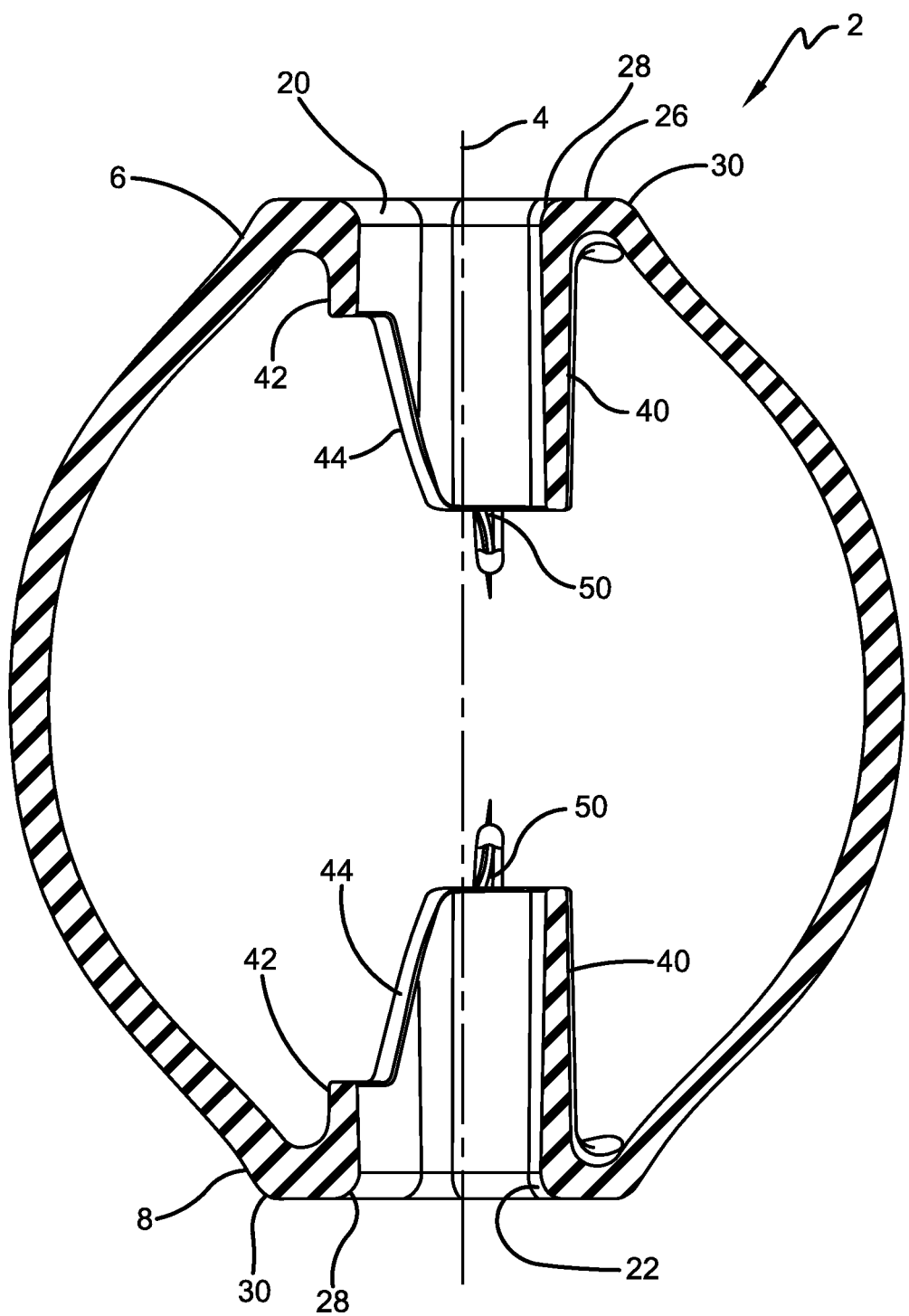
FIG. 3 is a section view taken along line 3-3 of FIG. 1.
Figure 4:
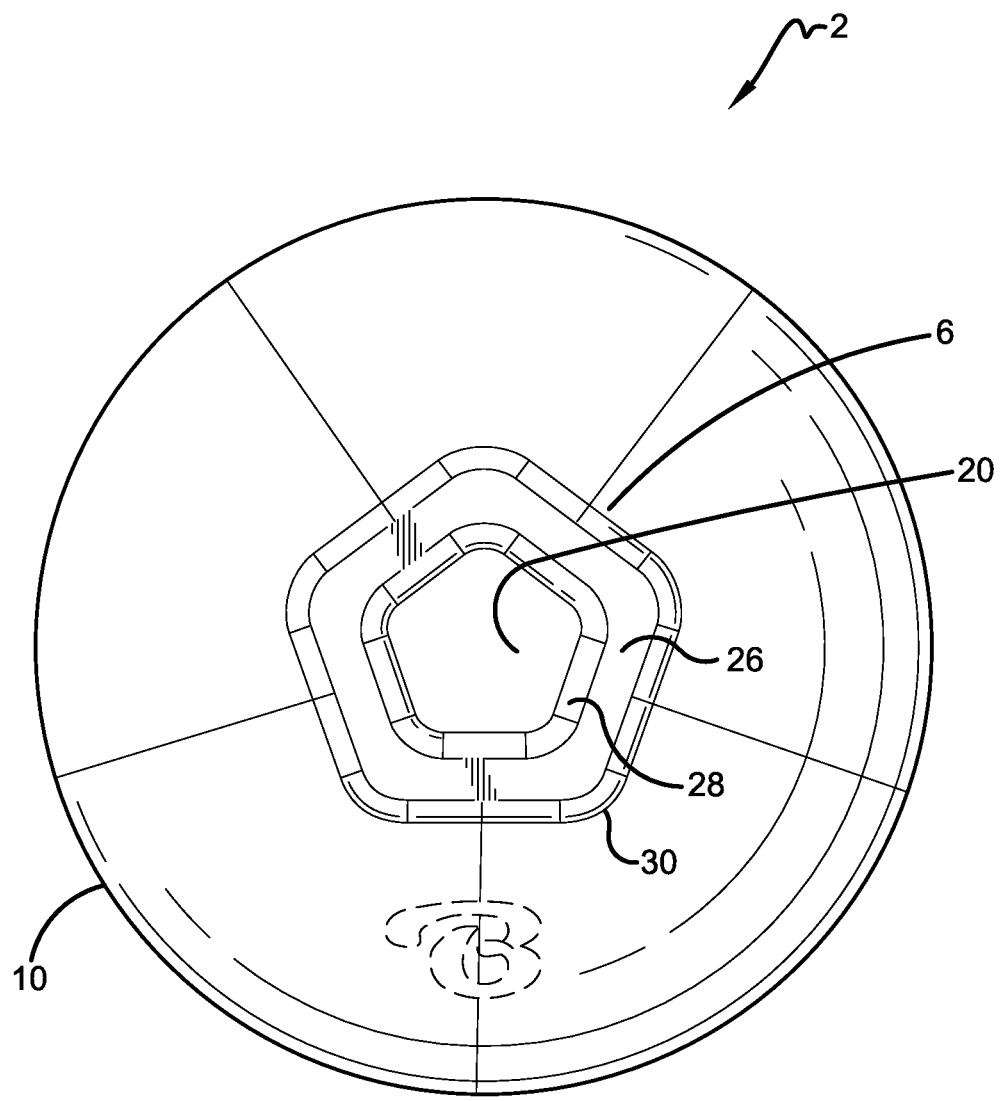
FIG. 4 is a top plan view of the toy of FIG. 1.

To increase the number of treats that enter scoop 40 from the inside of the body, the scoop wall has at least one section 42 of reduced height which increases the size of the opening of scoop 40. In the exemplary configuration, reduced-height section 42 extends about two-fifths of scoop 40 with its height tapering at angled edges 44 to a minimum height at its center. Measured from surface 26, the minimum height is thirty to forty-five percent of the maximum height of the scoop wall. Section 42 is centered about one of the corners of the pentagon. Section 42 enlarges the opening to scoop 40 to help scoop 40 gather treats. Sections 42 on the two scoops 40 at the different ends of the body can be aligned such that they are both facing the same direction when toy 2 is rolling (such as both facing up at the same time) or they can be offset or they can be opposite (one facing up and one facing down). In the exemplary configuration, they are aligned as shown in FIG. 3. When toy 2 is relatively full of treats and toy 2 is placed on its side with axis 4 horizontal, each scoop 40 gathers treats as toy 2 is moved and the treats fall out through dispensing openings 20 and 22 for the pet to eat. When the level of treats inside toy 2 falls below the level of scoops 40, treats are gathered by scoops 40 by the wobbling motion of toy 2 with its ends 6 and 8 alternately moving close to the ground. This motion move scoops 40 closer to the lower levels of treats inside toy 2.

An additional structure that helps scoops 40 gather the treats are wings 50 that extend outwardly from the sides of each scoop 40 with section 42 between wings 50 so that wings 50 do not block the opening defined by section 42. Wings 50 can be diametrically opposite 180 degrees apart or arranged at another configuration such as 120 degrees apart. Wings 50 increase the rigidity of toy 2. The outer edge 52 of each wing is connected to the inner surface of the body of toy 2 or closely spaced to the inner surface to prevent treats from passing under wing 50. The inner edge 54 of each wing 50 is curved to raise (towards equator 10) the outer tips of wings relative to its scoop 40. The outer tips of wings 50 as shown in FIG. 3 extend closer to equator 10 than scoop 40. When toy 2 is rolling on the ground, wings 50 engage the treats along the bottom of the ends of toy 2 and lift or project them toward scoops 40 where they can be dispensed. The rolling motion of toy 2 causes wings 50 to engage the treats inside toy 2 and help move them around to make noise and to increase the chances that treats are dispensed.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the toy is an example and the scope of the claims is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A pet toy, comprising:
a body having an outer wall that defines an interior chamber;
the body defining a body opening through the outer wall providing access to the interior chamber;
the body having a scoop extending from the outer wall into the interior chamber around the body opening; the scoop being defined by a scoop wall having a section of reduced height to define a first portion of a scoop treat opening; the scoop wall having a proximate end at the body and a distal end inside the interior chamber; the distal end of the scoop wall being open to define a second portion of the scoop treat opening; the first and second portions of the scoop treat opening being joined to form the scoop treat opening such that treats within the body can be gathered by the scoop through the scoop treat opening; and
the scoop wall being free of treat openings opposite the first portion of the scoop treat opening.

2. The pet toy of claim 1, wherein the body defines a rim with a flat surface around the body opening.

3. The pet toy of claim 2, wherein the body defines an inner rounded shoulder between the flat surface and the scoop.

4. The pet toy of claim 2, wherein the scoop has a maximum height defined from the flat surface; the section of reduced height defining a minimum height of the scoop defined from the flat surface; the minimum height being thirty to forty-five percent of the maximum height of the scoop.

5. The pet toy of claim 1, wherein the outer wall is elongated and has a longitudinal axis; the body being elongated along the longitudinal axis to have a longitudinal length greater than a maximum width of the body; the body opening being located on the longitudinal axis.

6. The pet toy of claim 5, wherein the scoop has a cross section perpendicular to the longitudinal axis that is the same shape as the body opening.

7. The pet toy of claim 1, wherein the outer wall has an equator defining a maximum width of the outer wall.

8. The pet toy of claim 7, wherein the body is substantially spherical at the equator.

9. A pet toy comprising:
an elongated, hollow body having a longitudinal axis; the body having first and second ends along the longitudinal axis; the hollow body being elongated along the longitudinal axis;
the body having an equator half way between the first and second ends;
the body having an outer wall that defines a first body opening at the first end and a second body opening at the second end;
the body being substantially spherical at the equator such that the body can roll on a surface with the first and second body openings spaced above the surface; the body having a diameter at the equator; the diameter being less than a distance between the first body opening and the second body opening;
the body having a first scoop extending into the body about the first body opening; the first scoop having a wall extending continuously about a perimeter of the first body opening; the first scoop having a section of reduced height to define a first portion of a scoop treat opening; the scoop wall having a proximate end at the body and a distal end inside the interior chamber; the distal end of the scoop wall being open to define a second portion of the scoop treat opening; the first and second portions of the scoop treat opening being joined to form the scoop treat opening such that treats within the body can be gathered by the scoop through the scoop treat opening; and the scoop wall being free of treat openings opposite the first portion of the scoop treat opening;

the body having a second scoop extending into the body about the second body opening; the second scoop having a wall extending continuously about a perimeter of the second body opening; the second scoop having a section of reduced height to define a first portion of a scoop treat opening; the scoop wall having a proximate end at the body and a distal end inside the interior chamber; the distal end of the scoop wall being open to define a second portion of the scoop treat opening; the first and second portions of the scoop treat opening being joined to form the scoop treat opening such that treats within the body can be gathered by the scoop through the scoop treat opening; and the scoop wall being free of treat openings opposite the first portion of the scoop treat opening; and the first and second scoops being spaced from each other inside the body; the entire body of each scoop being located between a reference plane that includes the equator of the body and the end from which the scoop extends.

10. The pet toy of claim 9, wherein each scoop has five walls; the section of reduced height including two contiguous walls.

11. The pet toy of claim 10, wherein the body defines a rim with a flat surface around each body opening.

12. The pet toy of claim 11, wherein the body defines inner rounded shoulders between the flat surfaces and the scoops.

13. The pet toy of claim 12, wherein each scoop has a maximum height defined from the flat surface; the section of reduced height defining a minimum height of each scoop defined from the flat surface; the minimum height being thirty to forty-five percent of the maximum height of the scoop.

14. The pet toy of claim 10, wherein the section of reduced height for each scoop has a minimum height located at a junction between the two contiguous walls.

15. The pet toy of claim 9, wherein the sections of reduced height of the scoops are aligned on the first and second scoops.

16. The pet toy of claim 9, wherein the first scoop has a cross section perpendicular to the longitudinal axis that is the same shape as the first body opening.

17. The pet toy of claim 16, wherein the second scoop has a cross section perpendicular to the longitudinal axis that is the same shape as the second body opening.

18. The pet toy of claim 9, wherein the body includes first and second wings extending from each scoop.

19. The pet toy of claim 18, wherein the section of reduced height of each scoop is located between the first and second wings.

* * * * *